US012537833B2

(12) United States Patent
Noon et al.

(10) Patent No.: US 12,537,833 B2
(45) Date of Patent: *Jan. 27, 2026

(54) DEFANGING MALICIOUS ELECTRONIC FILES BASED ON TRUSTED USER REPORTING

(71) Applicant: Material Security Inc., San Francisco, CA (US)

(72) Inventors: Ryan M. Noon, Mountain View, CA (US); Abhishek Agrawal, Redwood City, CA (US); Christopher J. Park, San Jose, CA (US)

(73) Assignee: Material Security Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/093,823

(22) Filed: Mar. 28, 2025

(65) Prior Publication Data

US 2025/0254184 A1    Aug. 7, 2025

Related U.S. Application Data

(63) Continuation of application No. 18/508,942, filed on Nov. 14, 2023, which is a continuation of application
(Continued)

(51) Int. Cl.
*H04L 9/40* (2022.01)
*G06F 9/54* (2006.01)

(52) U.S. Cl.
CPC .......... *H04L 63/1416* (2013.01); *G06F 9/54* (2013.01); *H04L 63/1425* (2013.01); *H04L 63/1441* (2013.01)

(58) Field of Classification Search
CPC .......... H04L 63/1416; H04L 63/1425; H04L 63/1441; G06F 9/54
(Continued)

(56) References Cited

U.S. PATENT DOCUMENTS 8,850,571 B2 *  9/2014  Staniford ............ G06F 9/45533
                                              713/188
9,781,152 B1 * 10/2017  Mistratov ............. G06F 21/577
(Continued)

FOREIGN PATENT DOCUMENTS

WO    WO 2017/195199 A1    11/2017

OTHER PUBLICATIONS

Balinsky et al., "System Call Interception Framework for Data Leak Prevention", 2011, 2011 15th IEEE International Enterprise Distributed Object Computing Conference, pp. 139-148 (Year: 2011).
(Continued)

*Primary Examiner* — Badri Narayanan Champakesan
*Assistant Examiner* — Badri Champakesan
(74) *Attorney, Agent, or Firm* — Fenwick & West LLP

(57) ABSTRACT

A system and method are disclosed for determining that a first electronic communication, received in a first private repository of a user, has been identified (e.g., flagged) as including a threat, and determining a probability that the first electronic communication includes the threat. In response to determining that the probability exceeds a threshold probability, the system monitors monitoring for a second electronic communication, received in a second private repository, that includes contents that match the contents of the first electronic communication. In response to, based on the monitoring, identification of the second electronic communication, the system generates a copy of the second electronic communication to an administrative private repository of an administrator, edits the copy to remove a portion that is likely to include the threat, inserts the copy of the second electronic communication to the second private repository, and deletes the second electronic communication from the second private repository.

20 Claims, 9 Drawing Sheets

Related U.S. Application Data

No. 17/114,212, filed on Dec. 7, 2020, now Pat. No. 11,856,007, which is a continuation of application No. 16/376,982, filed on Apr. 5, 2019, now Pat. No. 10,893,060.

(58) Field of Classification Search
USPC .......................................................... 726/23
See application file for complete search history.

(56) References Cited

U.S. PATENT DOCUMENTS

| | | | |
|---|---|---|---|
| 9,923,921 | B1 | 3/2018 | Grafi |
| 10,326,777 | B2 | 6/2019 | Demopoulos et al. |
| 10,783,520 | B2* | 9/2020 | Moss ................. G06Q 20/4016 |
| 10,893,060 | B2* | 1/2021 | Noon ................. H04L 63/1441 |
| 11,019,076 | B1* | 5/2021 | Jakobsson ........... H04L 63/1483 |
| 11,558,405 | B2 | 1/2023 | Cheetancheri et al. |
| 2005/0193429 | A1* | 9/2005 | Demopoulos ....... H04L 63/0263 713/188 |
| 2005/0273856 | A1* | 12/2005 | Huddleston ........... G06F 21/566 726/22 |
| 2009/0282482 | A1* | 11/2009 | Huston ............... H04L 63/1416 726/23 |
| 2010/0162400 | A1 | 6/2010 | Feeney et al. |
| 2011/0209196 | A1 | 8/2011 | Kennedy |
| 2012/0278890 | A1* | 11/2012 | Maatta ................. H04L 43/062 726/23 |
| 2015/0026027 | A1* | 1/2015 | Priess ................... G06Q 10/04 705/35 |
| 2016/0050181 | A1* | 2/2016 | Halpern ................ H04L 63/308 726/23 |
| 2017/0085584 | A1 | 3/2017 | Goutal |
| 2017/0161839 | A1* | 6/2017 | Loughran .............. G06Q 40/08 |
| 2017/0223034 | A1* | 8/2017 | Singh .................. H04L 63/1433 |
| 2018/0191754 | A1* | 7/2018 | Higbee ............... H04L 63/1416 |
| 2019/0020687 | A1 | 1/2019 | Noon et al. |
| 2019/0052655 | A1 | 2/2019 | Benishti |
| 2019/0245894 | A1 | 8/2019 | Epple et al. |
| 2020/0067861 | A1 | 2/2020 | Leddy et al. |

OTHER PUBLICATIONS

Extended European Search Report, European Patent Office Application No. 20782379.0, Nov. 8, 2022, 6 pages.

International Search Report and Written Opinion, Patent Cooperation Treaty Application No. PCT/US20/18108, Apr. 22, 2020, 14 pages.

Parasuraman et al. 2014 IEEE, International Conference on Electronics, Communication and Computational Engineering (ICECCE), "Secured Document Management through A Third Party Auditor Scheme in Cloud Computing", pp. 109-118 (Year: 2014).

Resnick, P., Memorandum on Internet standards track protocol, The Internet Society, Apr. 2001, 50 pages, [Online] [Retrieved Apr. 5, 2019], Retrieved from the internet <URL:https://www.ietf.org/rfc/rfc2822.txt>.

United States Office Action, U.S. Appl. No. 16/376,982, Aug. 25, 2020, nineteen pages.

United States Office Action, U.S. Appl. No. 17/114,212, Mar. 21, 2023, 25 pages.

\* cited by examiner

| Key Value Store | |
|---|---|
| Key | Value |
| [HID, Account ID, Host] | {Headers, tags, hostMsgID, lastLockStubID, lastNATOStub, lastLockAnalysis, LastRemediation, CaseAssigned, leaseID, SensitiveMark, SuspiciousMark, ...} |
| Key 2 | Values |
| ... | ... |

*FIG. 4*

Incidents

| | DESCRIPTION | CAUSE 630 | SCOPE 640 | |
|---|---|---|---|---|
| ☐ | Star Wars Team Offsite<br>promotions@starwarsmovie.com | Reported by rliu@company.com (+3 others) | In 970 mailboxes | Choose Remediation ⌄ |
| ☐ | Password Reset Required<br>password-help@itsupport.com | Reported by jim@company.com | In 12 mailboxes | Choose Remediation ⌄ 620 |
| ☐ | Lost Puppy<br>lostandfound@teamnofication.com | Reported by klide@company.com (+11 others) | In 3 mailboxes | Allow (non-malicious)…<br>Allow (with warning)…<br>Deny (malicious)…<br>Deny (educate)… |
| ☐ | 2019 Department Budget<br>luke.json8000@gmail.com | Auto-flagged by third-party | In 135 mailboxes | |
| ☐ | Fax Message NoReply [admin]<br>noreply@efacks.com | Reported by molly@company.com | In 9 mailboxes | Choose Remediation ⌄ |
| ☐ | (no subject)<br>tk867530@gmail.com | Reported by lsmith@company.com (+1 other) | In 1,230 mailboxes | Choose Remediation ⌄ |
| ☐ | Dropbox Password Reset<br>no-reply@dbxmail.com | Reported by sfinn@company.com | In 2 mailboxes | Choose Remediation ⌄ |
| ☐ | Q3 Invoice<br>jane.doe@mountaindayschool.org | Reported by rliu@company.com | In 2 mailboxes | Choose Remediation ⌄ |

*FIG. 6*

DEFANGING MALICIOUS ELECTRONIC FILES BASED ON TRUSTED USER REPORTING

CROSS REFERENCE TO RELATED APPLICATIONS

This application is a continuation of U.S. application Ser. No. 18/508,942, filed Nov. 14, 2023, which is a continuation of U.S. application Ser. No. 17/114,212, (now U.S. Pat. No. 11,856,007) filed Dec. 7, 2020, which is a continuation of U.S. application Ser. No. 16/376,982 (now U.S. Pat. No. 10,893,060) filed Apr. 5, 2019, all of which are incorporated herein by reference in their entirety.

TECHNICAL FIELD

The disclosure generally relates to the field of electronic file protection, and more particularly relates to identifying malicious aspects in electronic files, as well as remediation techniques for enabling access to versions of the electronic files where the malicious aspects are defanged.

BACKGROUND

Phishing has become a common scheme in today's increasingly electronic world, where malicious users attempt to fool people into taking action to their detriment (e.g., clicking a link that leads to a malware download; handing over a password that unlocks a financial portal, etc.). Related art implementations set up filters to automatically detect phishing e-mails based on detectable characteristics (e.g., e-mails from an unknown domain, e-mails with content matching a particular pattern, etc.). However, clever creators of phishing messages have identified ways to create phishing messages that are not caught by the filters (e.g., by spoofing a whitelisted domain or performing other means of deception). Moreover, some of these phishing messages include malware that is not detectable by certain e-mail providers (e.g., a phishing message may be sent to a Gmail e-mail address and may include Apple malware; however, Gmail does not scan for Apple malware).

Phishing can be particularly damaging if successfully performed to infiltrate sensitive corporate information. Related art implementations, in addition to using filters, require an administrator for a corporation to identify potential phishing e-mail, confirm it is in fact malicious, and then react to the e-mail (e.g., by warning corporate employees not to open e-mails that resemble the identified malicious message). However, such manual reaction leads to a long lapse of time (e.g., 30 minutes to an hour, or more), where the malicious message may within that time have been accessed by employees and thus may have compromised the corporate infrastructure.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates one embodiment of a key value table for managing electronic files and their attributes, including their potential association with a phishing attempt.

FIG. 6 illustrates one embodiment of a user interface an administrator may use to manage remediation for a phishing file.

DETAILED DESCRIPTION

Figure 1:
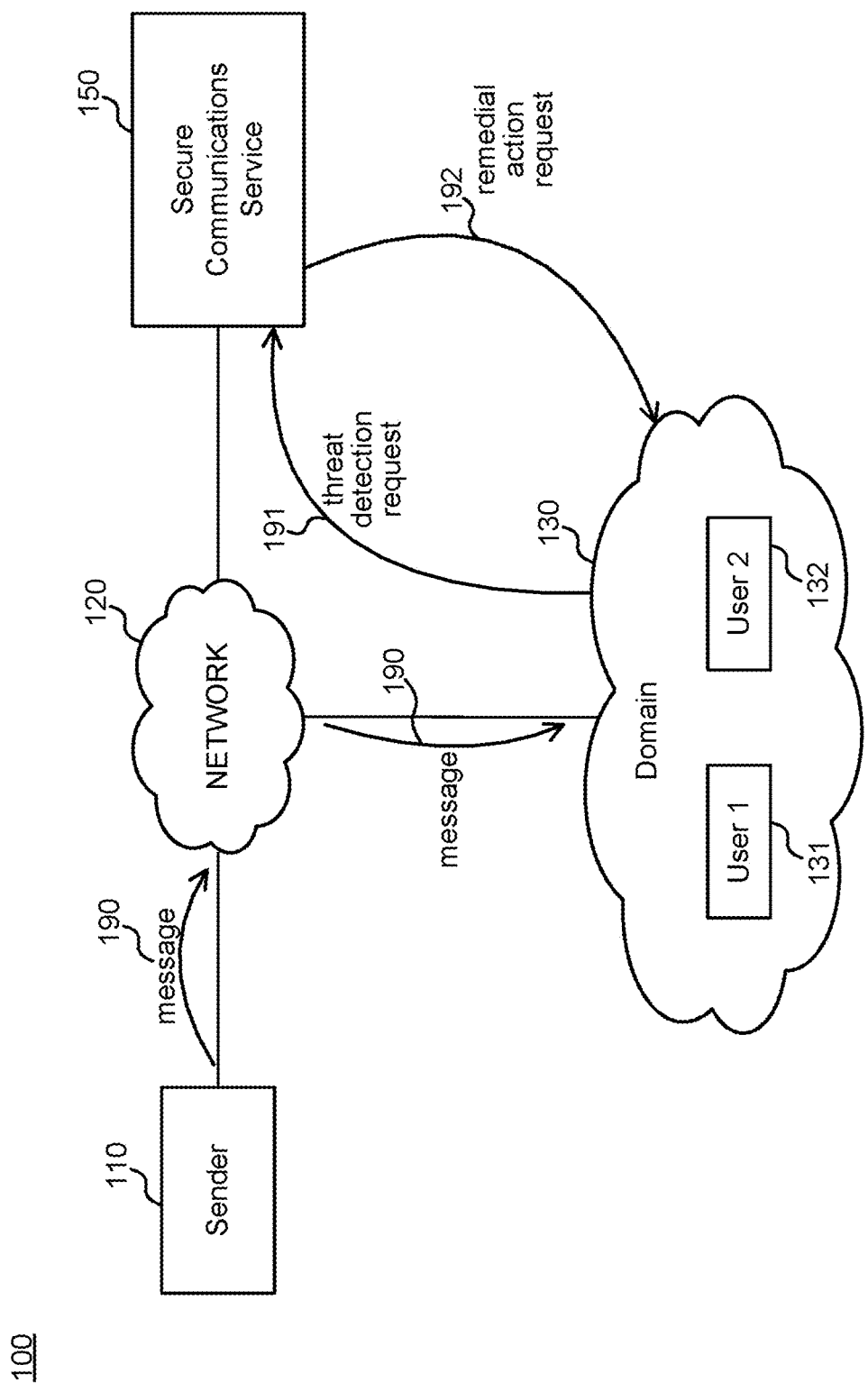
FIG. 1 illustrates one embodiment of a system environment including infrastructure for detecting and remediating phishing attempts.

The FIGURES (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (including device and/or apparatus), process (or method) and computer readable storage medium includes a phishing detection mechanism that, based on reporting that an electronic communication may be malicious by one user, automatically takes remedial action for an entire domain (or across several domains) to defang the same or similar electronic communications, thus preventing other users' systems (or infrastructures of a domain) from being compromised without a need for manual intervention by an administrator. To this end and others, a secure communications service may determine that an electronic communication, received in a first private repository of a user (e.g., inbox), has been identified (e.g., flagged) as including a threat (e.g., based on the user identifying (or flagging) the electronic communication. The secure communications service may determine that a probability that the flagged electronic communication includes a threat exceeds a threshold probability, and may responsively monitor for an additional electronic communication received in another user's private repository (or in the same user's private repository) that includes contents that match the contents of the flagged electronic communication.

The secure communications service may, responsive to identifying such a communication, replace the communication with a defanged version of the communication. To perform the replacement, the secure communications service may generate a copy of the identified electronic communication to an administrative private repository of an administrator, and may edit the copy to remove a portion that is likely to include the threat (e.g., removal of an attachment with malware, or of a link that leads to malware). The secure communications service may insert the copy of the electronic communication to the second private repository, and delete the second electronic communication from the second private repository, thus replacing the malicious message with a defanged version that protects the user.

Intercommunications System Between Domain(s) and Secure Communications Service

Figure (FIG. 1 illustrates one embodiment of a system environment including infrastructure for detecting and remediating phishing attempts. FIG. 1 depicts sender 110, which may be a client device or server from where message 190 originates. As will be described below, message 190 may be identified as being a phishing message. While the contents of message 190 are generally referred to in the context of an "electronic communication" (e.g., e-mail, simple messaging service (SMS), etc.), the contents of message 190 may be any type of file (e.g., a .doc file, a .pdf file, or any other type of file), even if the file itself is not a communication. The term message is used interchangeably with the term electronic communication.

Message 190 travels from sender 110 through network 120 to domain 130. The term domain, as used herein, may refer to a distinct group, such as a distinct group of individuals, a distinct group of computing devices, or a combination thereof. The domain may be demarcated by a unique address feature (e.g., a common domain name in an e-mail address; a common set of symbols in an addressing scheme, etc.). A practical example of a domain is a company, where the company name is used as the domain name, and employees' e-mail addresses all include "@[companyname].com." Private repository 131 corresponds to a first user (labeled "User 1"), and private repository 132 corresponds to the second user (labeled "User 2"). For convenience, the term private repository as used herein is primarily referenced as an e-mail inbox. However, the term private repository may refer to a repository of any type of electronic communication (e.g., e-mail, SMS, etc.) or any type of file (e.g., a private repository of personal files, such as .doc and .pdf files). Moreover, while the term private repository primarily refers to a repository private to a particular individual or account, the term private repository may refer to any repository that is closed off to some potential users (e.g., a shared repository as defined by access permissions being granted to particular users, or being accessible by way of a password). As depicted in FIG. 1, private repository 131 and private repository 132 are within domain 130; however, private repositories may be spread across multiple domains.

As depicted in FIG. 1, threat detection request 191 may be transmitted to secure communications service 150. Threat detection request 191 may be transmitted to secure communications service 150 over network 120 in a scenario where secure communications service 150 sits across network 120 from domain 130. In an undepicted embodiment, secure communications service 150 may be instantiated within domain 130, in which case threat detection request 191 need not be transmitted over network 120, and instead would be transmitted directly to the instantiation of secure communications service 150. Threat detection request 191 may include an electronic communication (or electronic file) flagged by a user (e.g., user 1 or user 2) as potentially including a threat. The manners in which a user may flag an electronic communication as including a threat will be described below.

Secure communications service 150 evaluates threat detection request 191 and the file or electronic communication flagged therein. The manner in which this evaluation occurs will be described in further detail below. In response to determining that the electronic communication or file includes a threat (e.g., because it is a phishing attempt), secure communications service 150 transmits remedial action request 192 to domain 130. Remedial action request 192 causes remedial action to take place to prevent other users (e.g., user 2, in the case where user 1 flagged an electronic communication) from accessing harmful portions of the electronic communication or file (e.g., which may cause user 2 to blindly expose domain 130 to compromise). The remedial actions that may be caused by secure communications service 150 will be discussed in further detail below. While not depicted, remedial action request 192 may be transmitted to additional domains as well, to enable remedial action on similar electronic communications and files detected by secure communications service 150 at other domains.

Secure Communication Service Architecture

Figure 2:
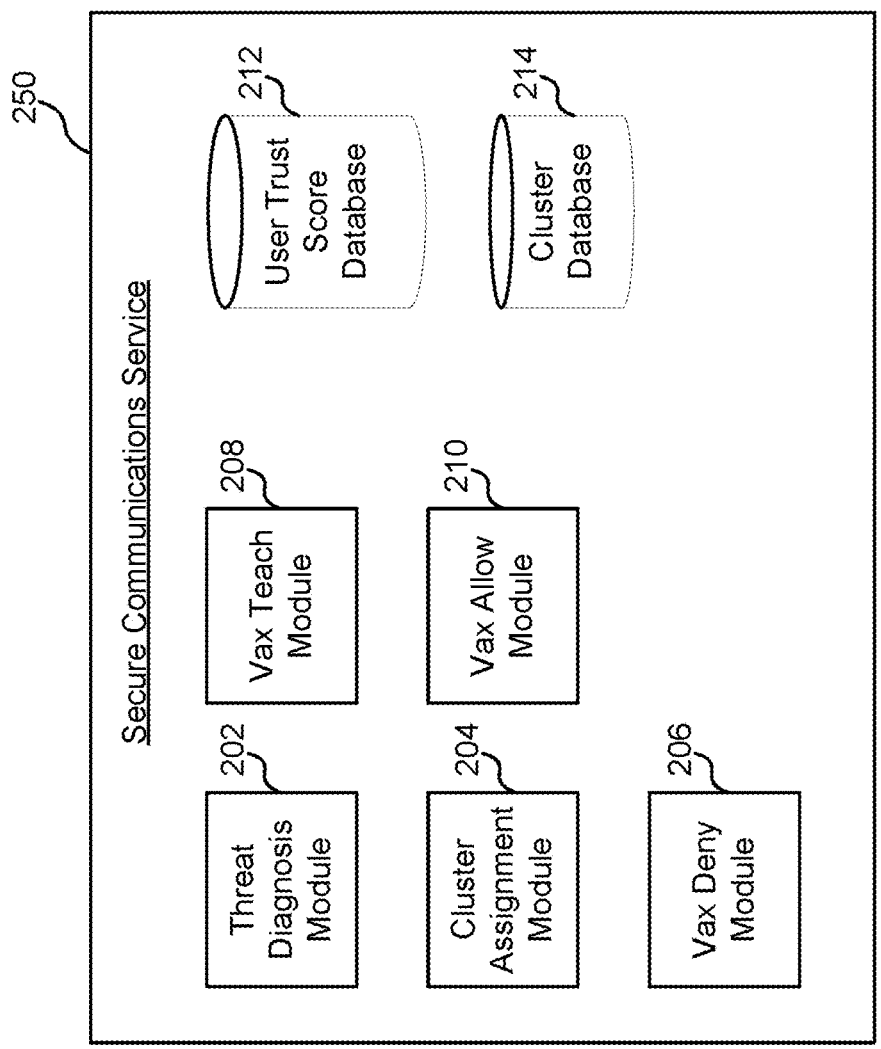
FIG. 2 illustrates one embodiment of exemplary modules and databases that are used by a secure communications service.

FIG. 2 illustrates one embodiment of exemplary modules and databases that are used by a secure communications service. Secure communications service 250 may include all functionality described above with respect to secure communications service 150. In one embodiment, secure communications service 250 may include a threat diagnosis module 202, a cluster assignment module 204, a vaccination (or vax) deny module 206, a vax teach module 208, a vax allow module 210, a user trust score database 212, and a cluster database 214. The modules may be embodied as functional program code (comprised of instructions) that may be stored on a storage device (e.g., memory) and may be executed by one or more processing devices (e.g., processor, controller, state machine). The modules and databases are further described herein.

The threat diagnosis module 202, when executed, evaluates an electronic communication or file (e.g., message 190) for a threat. For example, secure communications service 250 may execute threat diagnosis module 202 in response to receiving threat detection request 191 that identifies the potential threat (e.g., based on user 1 flagging message 190 as potentially including a threat).

Threat diagnosis module 202, when executed, may either analyze the trustworthiness of the reporting user (e.g., the trustworthiness of user 1), the content of the reported electronic communication or file (e.g., for patterns that match template patterns of known threats), or a combination thereof. When analyzing the trustworthiness of the reporting user, threat diagnosis module 202 may retrieve a trust score corresponding to the reporting user from user trust score database 212, and may determine that message 190 includes a threat if the reporting user has a trust score that exceeds a threshold, as will be described below.

Cluster assignment module 204, when executed, may assign similar messages (e.g., message 190 and messages resembling message 190, as will be discussed below) to a given case or cluster for similar remediation. When remediation modules are executed for an electronic communication or file, the remediation module may apply to each message or file within the cluster of the remediated file.

Remediation modules may include vax deny (or VaxDeny) module 206, vax teach (or VaxTeach) module 208, and vax allow (or VaxAllow) module 210. In brief, VaxDeny module 206, when executed, replace a message in a private repository (e.g., message 190 in private repository 131) with a defanged message that resembles the original message but removes a threat. Examples are further provided below with respect to FIGS. 6-8. For example, the threat may be a payload, such as a link or attachment that leads to or includes malicious content. The threat may be removed by VaxDeny module 206 replacing the attachment or link with a .url file, or a link, respectively, that redirects a user who attempts to access the defanged payload to a page hosted by secure communications service 250. VaxTeach module 208, in addition to defanging the message in a similar manner to VaxDeny module 206, adds an educational message to the message, as will be described below with respect to FIGS. 6-8. VaxAllow module 210 defangs the message using similar redirect mechanisms described above with respect to VaxDeny module 206, where the redirected page hosted by secure communications system 250 includes a warning the user that other users (e.g., user 2) have reported the message as suspicious, and additionally enables the user to access the potentially threatening content in the message, as will be described below with respect to FIGS. 6-8.

While depicted as a part of secure communications service 250, user trust score database 212 and/or cluster database 214 may be partially or fully located at another location, such as within domain 130 (e.g., as part of an administrative log of user activity for users, as well as clustered messages, within domain 130), or as a third party service, accessible by way of network 120. Trust score database 212 may store trust scores for known users (e.g., users of domain 130, and users of additional domains known to secure communications service 250). Initially, the users may be assigned a default trust score (e.g., of zero, of a median or average current trust score, or any other default score assigned by an administrator). The trust score may then be altered (e.g., by an administrator of domain 130 or by secure communications service 250) based on how often users flag electronic communications as threats where electronic communications are in fact threats. For example, administrators may evaluate whether a flagged communication is in fact a threat, and on confirmation by the administrators, the users' trust scores may be increased (or decreased on rejection by the administrators). As another example, if a flagged communication matches a communication known to be a threat, or known to be highly likely to be a threat (e.g., based on reporting by another user), the user who flagged the communication may have his or her trust score increased without intervention by an administrator.

Figure 3:
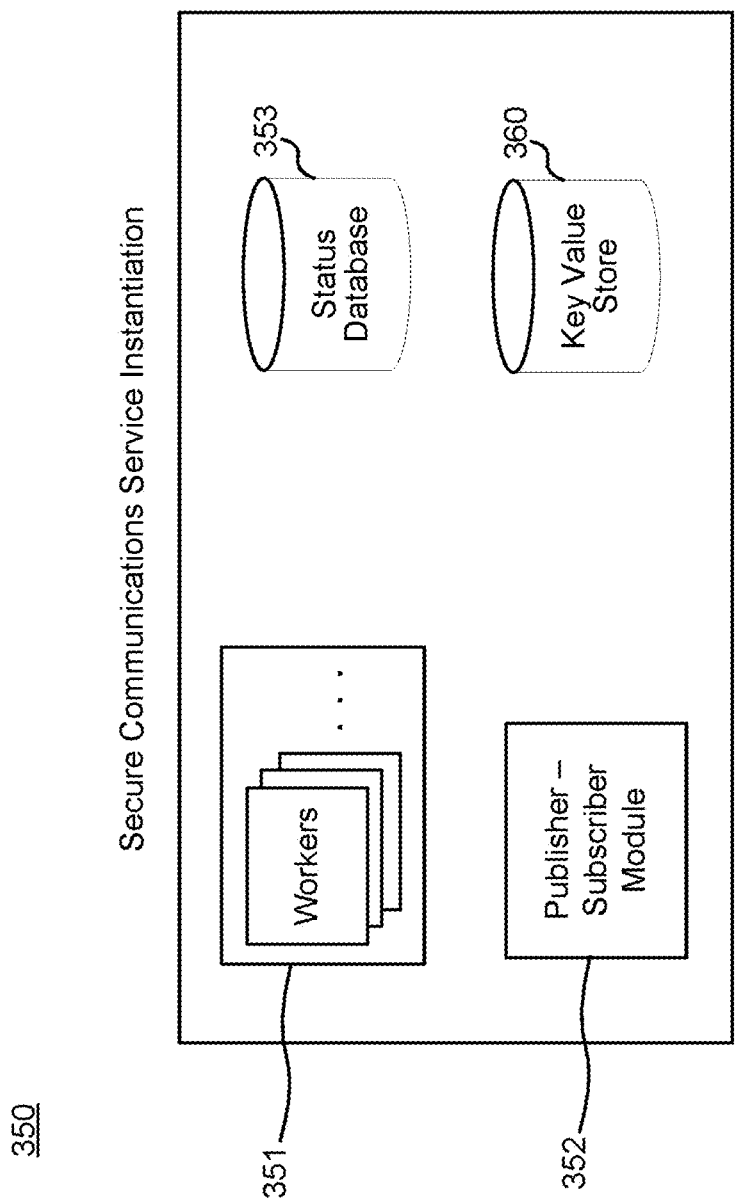
FIG. 3 illustrates one embodiment of an exemplary secure communications service instantiation.

FIG. 3 illustrates one embodiment of an exemplary secure communications service instantiation. Secure communications service instantiation 350 may be an instantiation of secure communications service 150 that is specific to a particular domain (e.g., domain 130). In this example, secure communications service instantiation 350 may include workers 351, publisher-subscriber module 352, status database 353, and key value store 360. Secure communications service instantiation 350 includes a plurality of workers 351. Each worker of workers 351 has a dedicated task (e.g., fetch e-mail, modify e-mail, etc.). Having a plurality of workers 351 is advantageous because it enables secure communications service 150 to scale to enormous size, as each new task during scaling can be dedicated to its own new worker of workers 351.

To enable workers to recognize tasks and perform them, secure communications service instantiation 350 executes publisher-subscriber module 352. Publisher-subscriber module 352 publishes tasks that are to be performed by workers 351. Each published task includes an indication of a topic, along with instructions for the task itself. Each of workers 351 may subscribe to its own subscription topic, such that when publisher-subscriber module 352 publishes a task with a given topic, the correct worker recognizes and performs the task.

Status database 353 comprises a register of what accounts are subscribed to secure communications service instantiation 350 (e.g., a register of user accounts (e.g., user 1 and user 2 of domain 130)) and the status of those accounts and electronic communications and files corresponding to those accounts (e.g., electronic communications and/or files in private repository 131). Key value store 360 is a register that maps attributes of messages (e.g., message 190) of a private repository (e.g., private repository 131), and is relied upon by publisher-subscriber module 352, in connection with status database 353, to determine what tasks to publish. Key value store 360 is described in detail with reference to FIG. 4 below.

FIG. 4 illustrates one embodiment of a key value store for managing electronic files and their attributes, including their potential association with a phishing attempt. Key value store 460 contains the functionality described above with respect to key value store 360. Key value store 460 is a data structure comprising keys 461 and corresponding values 460. In an embodiment, the data structure is a hash map. In one embodiment, key value store 460 indicates the state of the world as secure communications service instantiation 350 knows it to be. If secure communications service instantiation 350 is reflecting the status of electronic communications hosted by a particular host, such as GOOGLE GMAIL, then key value store 460 is initialized based on message values originating from GMAIL. Key value store 460 is then updated as secure communications service instantiation 350 propagates changes to private repositories (e.g., of domain 130) to reflect updated states of the world.

Keys 461 may include a message identifier for each message. The message identifier may be a, for example, a tuple of a host identifier ("HID"), an account identifier ("Account ID"), and a host value. The HID is a standard value found in, e.g., RFC 2228 of the Internet Engineering Task Force (RFC 2228 refers to this value as "message-ID"), published in April 2001, a copy of which is submitted herewith and the disclosure of which is hereby incorporated by reference herein in its entirety. The account ID corresponds to a particular user (e.g., user 1 or user 2 as depicted in FIG. 1). The host may correspond to a particular provider. In the case of electronic communications such as e-mail, the host may correspond to Gmail or Outlook, which are e-mail access and management providers. In the case of electronic files generally, the host may correspond to DROPBOX or GOOGLE DRIVE, which are file access and management providers. It is noted that each key has corresponding values 462. The values depicted in FIG. 4 are merely exemplary and are non-exhaustive.

The headers of values 462 correspond to headers of a given electronic communication or file. The tags of values 462 are platform-neutral status identifiers for a given message. For example, state definitions on the Microsoft Outlook e-mail platform are different from state definitions on the Gmail platform. Secure communications service instantiation 350 may execute a normalization module to translate, based on known state identifiers, a given state to a platform neutral tag.

Host message identifier (HostMsgId) of values 462 corresponds to a message identifier for the given message that is assigned by the host. For example, if Gmail is the host, Gmail may assign an identifier to the message, and HostMsgId is used to create a correspondence between the key used in key value store 460 and the host's ID.

Last lock stub identifier (LastLockStubID) of values 462 indicates whether an electronic communication (or file) has been locked. The term locked, as used herein, refers to an electronic communication that has been rendered inaccessible to a user notwithstanding the electronic communication being within the user's private repository.

Last NATO stub (LastNATOStub) of values 462 indicates whether an electronic communication has been defanged (i.e., had threatening content or potentially threatening content, such as malware, either removed or identified to the user). The termed defanged is used interchangeably herein with the term "vaccinated," and generally refers to remedial action having been taken with respect to an electronic communication or a file, as described herein.

Last lock analysis (LastLockAnalysis) of values 462 indicates the reason why an electronic communication has been locked or unlocked. The term unlocked, as used herein, may refer to the re-enabling of access to an electronic communication that was previously locked. The lock reasons may indicate, e.g., that a particular user with a particular trust score flagged the message as threatening. The unlock reasons may indicate, for example, that the message has been vaccinated and thus is unlocked because it has been replaced with a vaccinated version.

Last remediation (LastRemediation) of values 462 indicates the particular vaccination used on an electronic communication or file.

Case assigned (CaseAssigned) of values 462 indicates a cluster to which an electronic communication has been assigned. The terms "case" and "cluster" are used interchangeably herein. Clusters will be described in further detail below with respect to FIG. 9.

Lease identifier (LeaseID) of values 462 indicates what node (i.e., worker of workers 351) has leased the ability to apply a change to values of a given key. In an embodiment, only one node can apply an action on a key at a time, and LeaseID ensures that only the currently leasing node can apply the action. LeaseID may indicate how long the lease is valid.

Sensitive mark (SensitiveMark) and suspicious mark (SuspiciousMark) of values 462 indicate whether a user has indicated that a message is sensitive, or suspicious, respectively.

The manner in which key value store 460 is updated and used to manage message content for various users is through applying differentials to known data. For example, key value store 460 indicates a state for every message of each known private repository. Thus, when a change is to be made, publisher-subscriber module 352 may publish a task as a particular change that is to be made (e.g., the marking of an e-mail as sensitive or suspicious when it was not previously marked as sensitive or suspicious) along with the indication of the key to which the change is to be made. The worker of workers 351 who subscribes to the topic corresponding to that task may lease the key (e.g., causing leaseID to update to indicate, e.g., the particular worker and the length of the lease). The worker may additionally command the change be made (e.g., command Gmail to mark the e-mail sensitive), and when the command is executed, the worker may make the change (e.g., change the value of SensitiveMark from 0 to 1).

In an embodiment, secure communications service instantiation 350 is item potent, which means that updates requested by publisher-subscriber module are kept present in case an update fails. For example, following the example above, if the host is Gmail, and the update is to label an e-mail as sensitive, it would be impossible to make this update if Gmail's servers are down and the e-mail is inaccessible. Thus, where secure communications service instantiation 350 is item potent, the update may be queued until Gmail is again accessible, at which time the e-mail may be updated. The state change in key value store 460 would be withheld until the e-mail is updated.

Computing Machine Architecture

Figure 5:
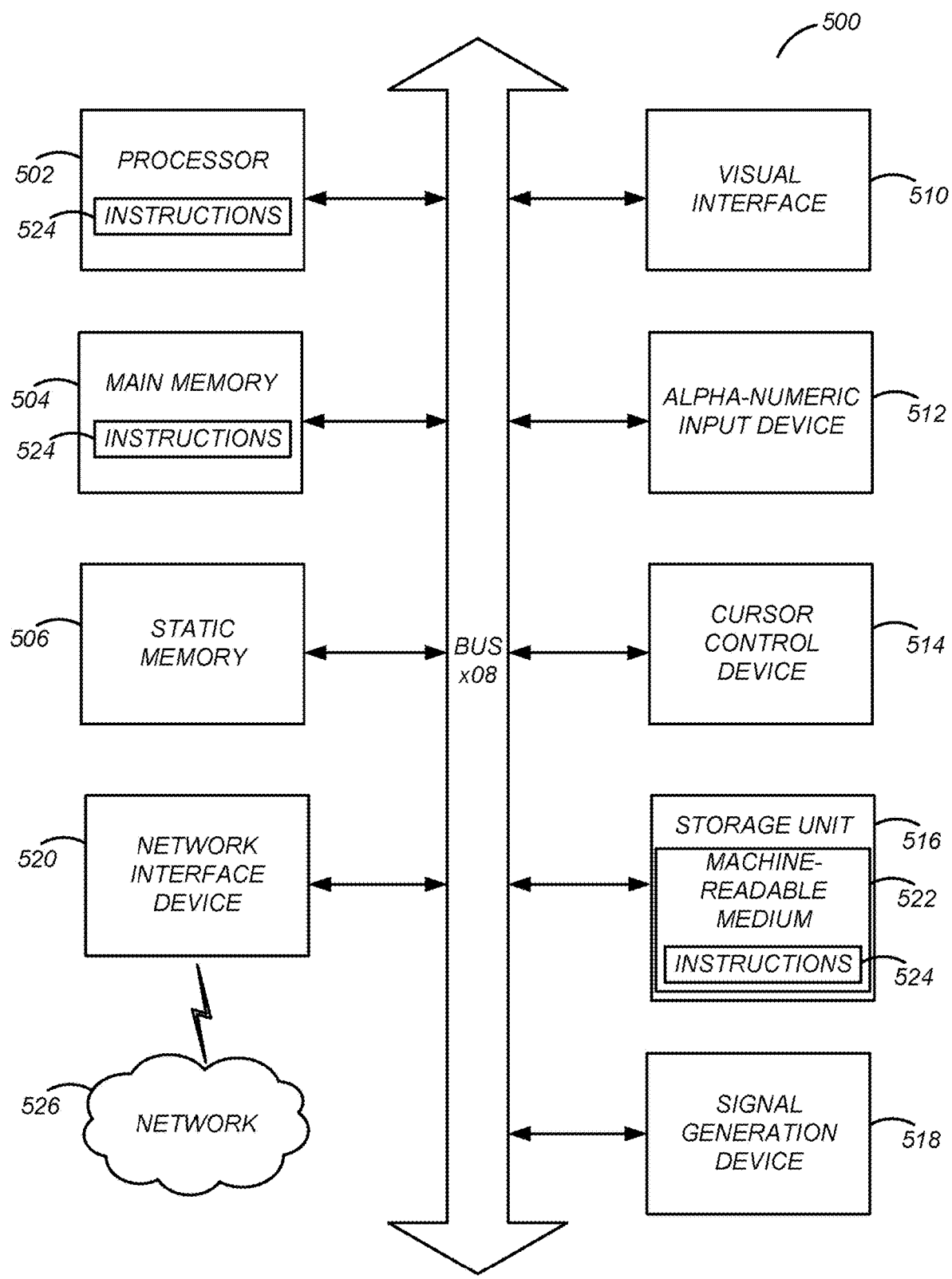
FIG. 5 is a block diagram illustrating components of an example machine able to read instructions from a machine-readable medium and execute them in a processor (or controller).

FIG. (FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software and/or modules) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

User Interface for Domain Administrators

FIG. 6 illustrates one embodiment of an example user interface an administrator may use to manage remediation for a phishing file. Administrative user interface 600 includes selectable options 610 that each correspond to electronic communications or files, remediation menu 620, remediation options 622, cause indicator 630, and scope indicator 640. The electronic communications or files shown in user interface 600 were flagged (e.g., by users such as user 1 and user 2 of FIG. 1) as potentially malicious. Selectable options 610, when selected, instruct a processor to perform a remediation selected from remediation menu 620 to each message corresponding to a selected selectable option. If none of selectable options 610 are selected, a processor operating administrative user interface 600 will apply a chosen remediation from remediation menu 620 to the message corresponding to the row from which remediation menu 620 was selected.

Remediation menu 620, when selected, opens a menu of remediation options 622, each remediation option operating on the electronic communication whose row corresponds to remediation menu 620, plus any additional electronic communications for which selectable options 610 are selected. Remediation options 622 are depicted as including four particular options, but may include fewer or more options than depicted.

Remediation options 622 include an option to allow the message (e.g., indicating the message was non-malicious). In response to selection of this option, secure communications service 250 will not take any corrective action with respect to the message in any private repository in which it sits.

Remediation options 622 also include an option to allow the message (e.g., with a warning)—this option is referred to as "VaxAllow" above and below. For example, the message may be replaced, as described above and below, with a defanged version of the message; however, the defanged message may include a link, or the original attachment, along with a warning stating that the link or attachment is suspicious. This will be described in further detail below with respect to FIGS. 7-8. Remediation options 622 also include an option to deny the message (e.g., if the message is determined to be malicious)—this option is referred to as "VaxDeny" above and below. In response to detecting the selectable option to deny the message, secure communications service 250 may replace the message with a copy of the message that excludes the threatening content, but otherwise preserves the message, as will be discussed further below with respect to FIGS. 7-8. Further, remediation options 622 may also include an option to deny the message, but to educate the user as to why the message is denied (e.g., by replacing the message with a copy of the message that excludes the threatening content, but additionally includes a message that explains to the user why the message was malicious to educate the user to spot and refrain from accessing similar messages in the future). This option is referred to as "VaxTeach" above and below. This will also be discussed in further detail below with respect to FIGS. 7-8.

Cause indicator 630 may indicate why a message was flagged as potentially including a threat. As depicted, a typical reason why a message was flagged is because various users flagged it. Other reasons may include flags from a third party (e.g., flags from users of an other domain that are received by secure communications service 150), or detection of malware within a payload by secure communications service 150 or by some other malware detection software. Scope 140 indicates how widespread the affliction is. Each mailbox (or private repository) afflicted may be logged in connection with a case or cluster by cluster assignment module 204 into cluster database 214.

User Interface for Vaccinated Messages

Figure 7:
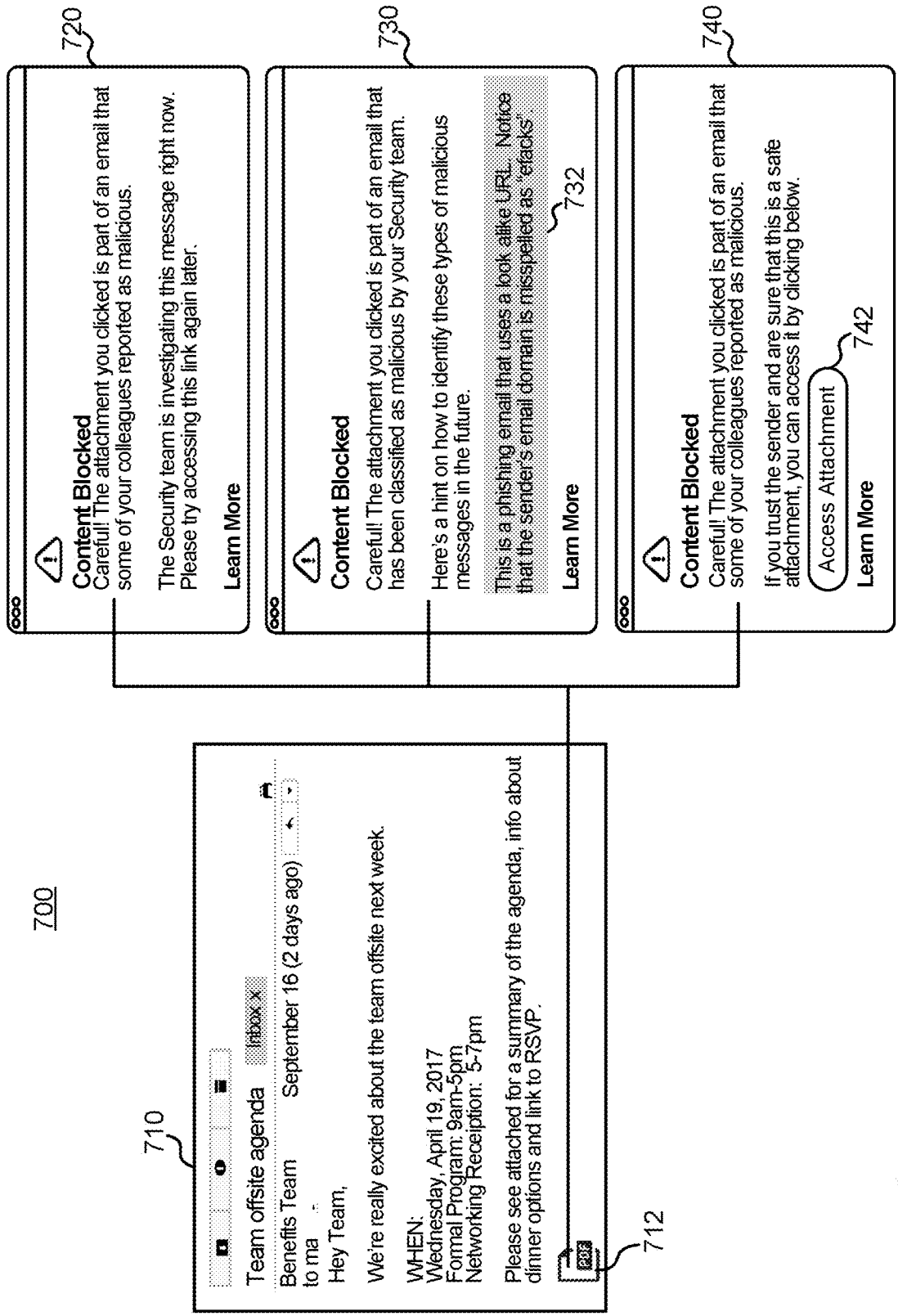
FIG. 7 illustrates one embodiment of candidate user interfaces for use when remediation has occurred with respect to an attachment.

FIG. 7 illustrates one embodiment of example candidate user interfaces for use when remediation has occurred with respect to an attachment. FIG. 7 depicts message 710, which includes as a payload attachment 712. Secure communications service 150 detects that attachment 712 is malicious and that a remedial measure is to be performed. Thus, secure communications service 150 may execute VaxDeny module 206, which replaces attachment 712 with a defanged copy of attachment 712. In an embodiment where VaxDeny is applied, when a user selects the defanged copy of attachment 712, user interface 720 is displayed (e.g., based on a redirect, as described above with reference to VaxDeny module 206), indicating that the content is blocked. In an embodiment, secure communications service 150 may execute VaxTeach module 208 to defang the message, in which case, when a user selects the defanged copy of attachment 712, user interface 730 is displayed (e.g., based on the redirect) that indicates that the content is blocked, and additionally displays why the content is blocked (e.g., a message noting that attachment 712 is part of a phishing e-mail). In an embodiment secure communications service 150 executes VaxAllow module 210, in which case, when a user selects the defanged copy of attachment 712, user interface 740 is displayed, which indicates that the content is blocked, along with selectable option 742 for accessing attachment 712.

Figure 8:
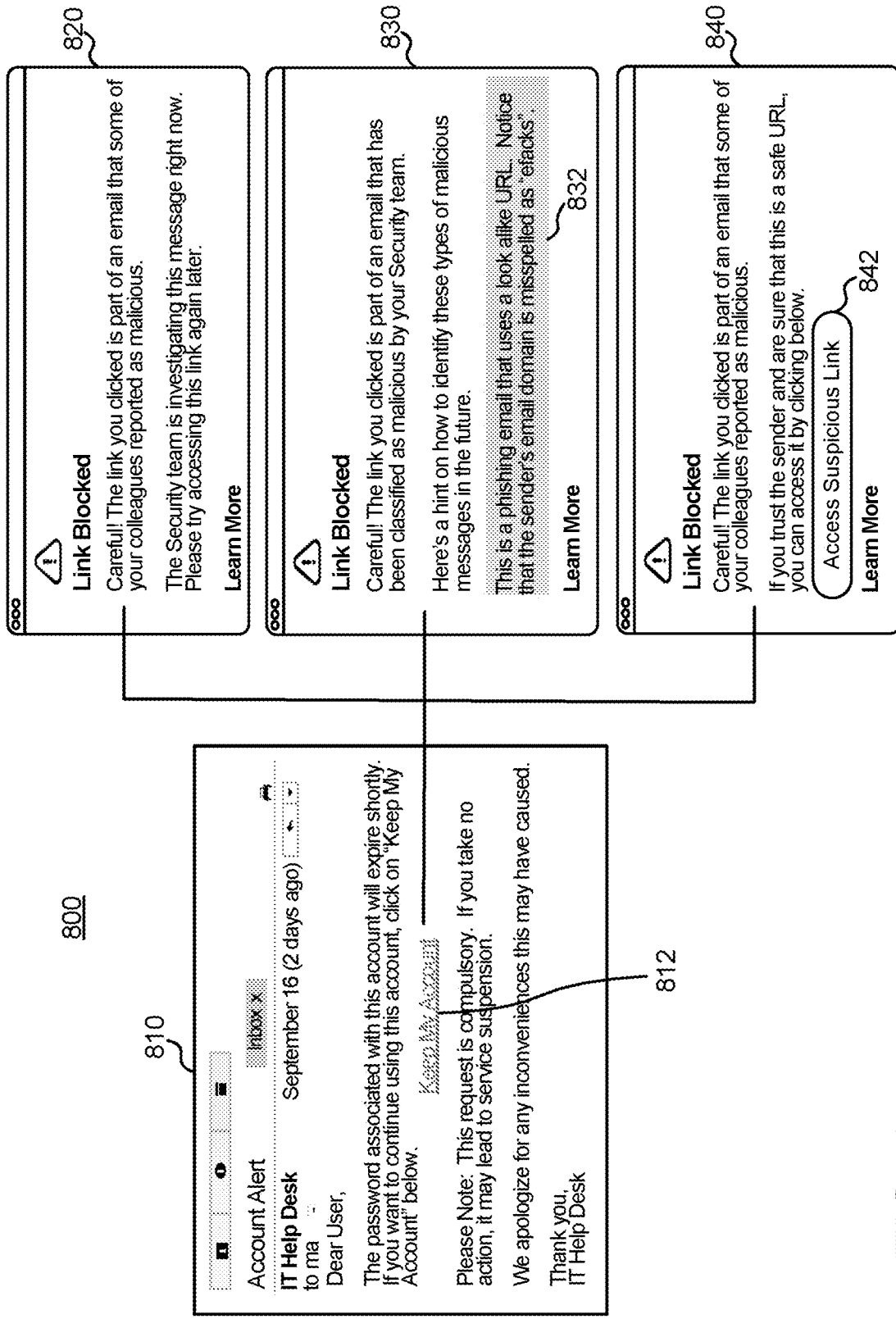
FIG. 8 illustrates one embodiment of candidate user interfaces for use when remediation has occurred with respect to a link.

FIG. 8 illustrates one embodiment of example candidate user interfaces for use when remediation has occurred with respect to a link. FIG. 8 depicts an example message 810, which includes as a payload attachment 812. Secure communications service 150 detects that attachment 812 is malicious and that a remedial measure is to be performed. Thus, secure communications service 150 may execute VaxDeny module 206, which replaces attachment 812 with a defanged copy of attachment 812. In an embodiment where VaxDeny is applied, when a user selects the defanged copy of attachment 812, user interface 820 is displayed (e.g., based on a redirect, as described above with reference to VaxDeny module 206), indicating that the content is blocked.

In an embodiment, secure communications service 150 may execute VaxTeach module 208 to defang the message, in which case, when a user selects the defanged copy of attachment 812, user interface 830 is displayed (e.g., based on the redirect) that indicates that the content is blocked, and additionally displays why the content is blocked (e.g., a message noting that attachment 812 is part of a phishing e-mail). In an embodiment secure communications service 150 executes VaxAllow module 210, in which case, when a user selects the defanged copy of attachment 812, user interface 840 is displayed, which indicates that the content is blocked, along with selectable option 842 for accessing attachment 812.

The system may detect payloads other than attachments and links. For example, a payload may be any content including a threat, such as a request for a user to purchase gift cards and then hand those gift cards over to the sender of the message. In such a scenario, the message may be defanged by obscuring or deleting the corresponding request, or by highlighting the request and indicating why it is dangerous.

Illustrative Process for Defanging Electronic Communications (and Files)

Figure 9:
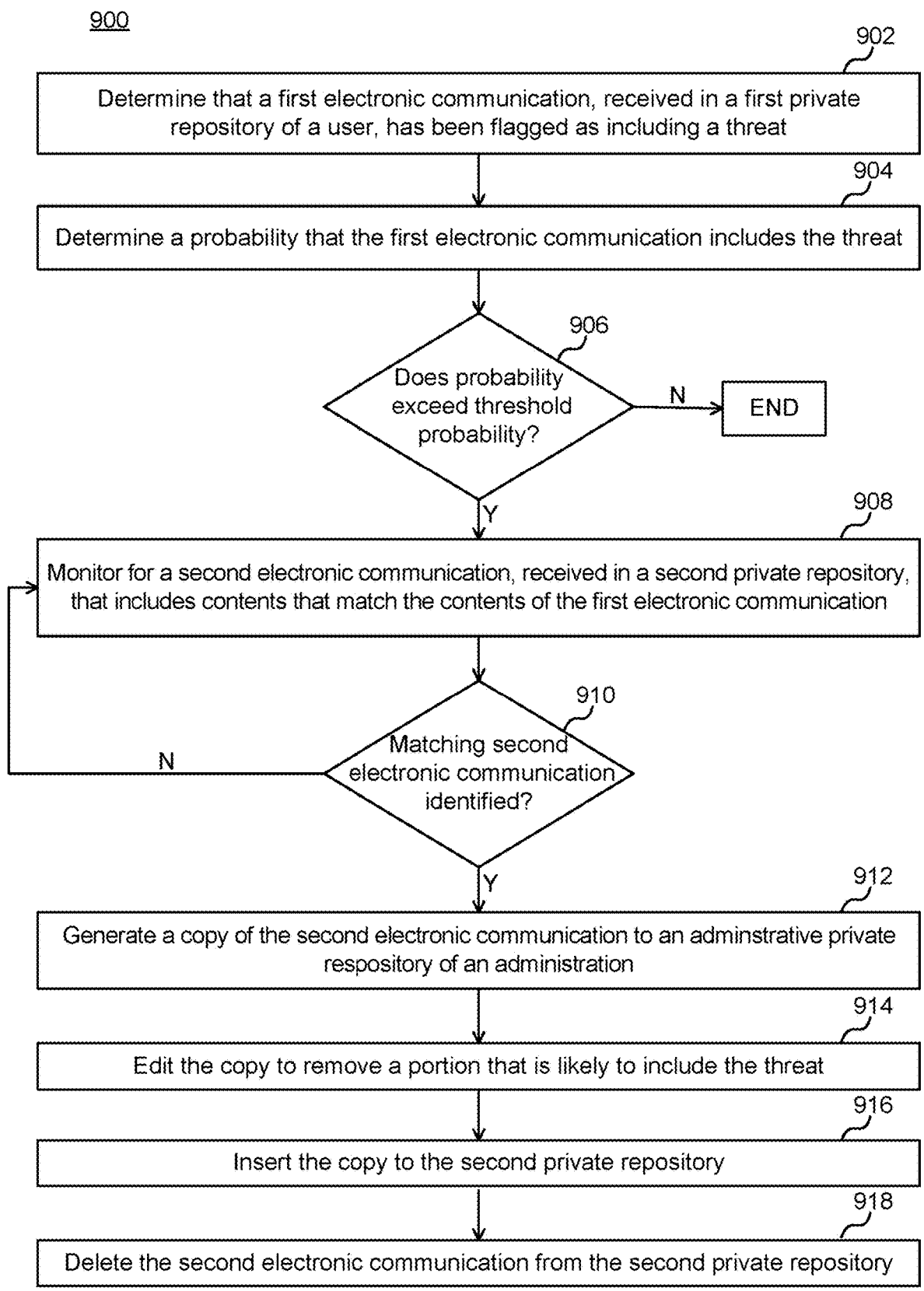
FIG. 9 illustrates one embodiment of an exemplary flowchart for identifying and defanging a phishing message.

FIG. 9 illustrates one embodiment of an exemplary flowchart for identifying and defanging a phishing message. Process 900 begins with secure communications service 150 determining 902 that a first electronic communication (e.g., message 190), received in a private repository of a user (e.g., private repository 131 of user 1), has been flagged as including a threat (e.g., by the user selecting a "suspicious" option). Secure communications service 150 then determines 904 a probability that the electronic communication includes the threat. In an embodiment, in connection with determining 904 the probability, the processor retrieves a trust score of the first user from a database (e.g., user trust score database 212). The trust score, as described above, may be based on how often the user has correctly flagged electronic communications as threats in the past. Secure communications service 150 may determine the probability based on the trust score.

In an embodiment, in connection with determining 904 the probability, secure communications service 150 may determine that an additional user also flagged the electronic communication as a threat (e.g., when a copy of the same, or a similar, communication arrived at the private repository of the original user). Secure communications service 150 may retrieve, in addition to the trust score of the first user, the trust score of the additional user. Secure communications service 150 may then aggregate the trust scores of the two users into an aggregated trust score (e.g., by performing a statistical operation) when determining the probability that the message is a threat. Further additional users' trust scores may be additionally aggregated to perform the determination of the probability.

Process 900 continues with secure communications service 150 determining whether the probability that the electronic communication includes the threat exceeds a threshold probability, where a negative determination causes process 900 to end. The threshold may be a default (or predefined) threshold, or may be set by an administrator. A positive determination causes secure communications service instantiation 150 to monitor 908 for another electronic communication, received in another private repository of another user (e.g., private repository 132 of user 2), that includes contents that match the contents of the flagged electronic communication. In an embodiment, the positive determination may additionally, or alternatively, cause communications service instantiation 150 to monitor the original private repository of the original user (e.g., private repository 131 of user 1) for additional similar messages to message 190 and perform remedial action per the below should such a message be detected.

In connection with monitoring 908, secure communications service 150 may search a plurality of private repositories within a domain (e.g., domain 130) for electronic communications that include contents that do not vary from the contents of the first electronic communication, or that vary less than a threshold variance. The term threshold variance, as used herein, refers to a message where only a small amount of characters in the message, if any, vary from the original message. As a result of the search, secure communications service 150 may detect a matching electronic communication. Secure communications service 150 may, alternatively or additionally, search within a different domain for such electronic communications.

Secure communications service 150 determines 910 whether a matching electronic communication has been identified during the monitoring in the manner described above and continues to monitor 908 if no matching electronic communication has been found. If, however, a matching electronic communication has been found, secure communication service 150 generates 912 a copy of the matching electronic communication to an administrative private repository of an administrator (e.g., an administrator of domain 130 and/or additional domains). Secure communications service 250 edits 914 the copy to remove a portion that is likely to include the threat (e.g., a payload such as a link or an attachment that is leading to, or includes, malware). In an embodiment, editing 914 may include executing VaxDeny module 206, VaxTeach module 208, or VaxAllow module 210. Secure communications service 150 inserts 916 the copy into the private repository where the matching message was found (e.g., private repository 132), and deletes 918 the matching message, thus effectively replacing the threatening message with a defanged message.

In an embodiment, different remediation may be performed in different private repositories for a same, or similar, messages. The different remediation may be performed based on user-specific features. For example, secure communications service 250 may, for each user whose private repository has an afflicted message, retrieve a trust score from trust score database 212. For users with trust scores above a high threshold, the remediation performed may be VaxAllow, as the users are trustworthy enough to decide whether to advance past a warning. For users with trust scores below the high threshold, but above a low threshold, the remediation performed may be VaxDeny, where the users are denied access to the threatening payload, but are not troubled with an educational message. For users with trust scores below the low threshold, the remediation performed may be VaxTeach.

In an embodiment, the threat itself may be graded. For example, if a particularly trustworthy user (as determined by secure communications service 150 based on data retrieved from trust database 212) marks a message as suspicious, secure communications service 150 may mark the message as being so potentially dangerous that the message is quarantined until an administrator has a chance to review (e.g., through the user interface of FIG. 6) and release the message, thus preventing even defanged copies of the message to reside in private repositories of users.

In an embodiment, timing of delivery of messages, generally, may be delayed based on trust scores of users, as retrieved from trust score database 212. For example, users with high trust scores may receive e-mails as they are received within domain 130. These users can be relied upon to flag dangerous e-mails once a danger is noticed. Thus, e-mails that are not flagged within a threshold period of time (e.g., 5 minutes) may be allowed to propagate to other users within domain 130.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for defanging electronic communications and files that include threats through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   determining that a first electronic communication, sent by a first user to a second user, received in a first private repository of the second user, has been identified by input from the second user as including a threat, the input expressing that the first electronic communication includes the threat;
   determining a probability that the first electronic communication actually includes the threat that was identified from the input from the second user;
   in response to determining that the probability that the first electronic communication actually includes the threat that was identified from the input from the second user exceeds a threshold probability, monitoring for a second electronic communication, transmitted to a second private repository of a third user, that includes contents that match the contents of the first electronic communication within a threshold variance; and
   in response to, based on the monitoring, identifying the second electronic communication that includes contents that match the contents of the first electronic communication, quarantining the second electronic communication.

2. The method of claim 1, wherein quarantining the second electronic communication comprises populating a copy of the second electronic communication to an administrative private repository of an administrator.

3. The method of claim 1, wherein quarantining the second electronic communication comprises preventing the second electronic communication from being persistently stored at the second private repository.

4. The method of claim 3, further comprising populating a modified version of the second electronic communication to the second private repository.

5. The method of claim 3, wherein the first private repository is within a domain, wherein the second private repository is also within the domain, and wherein monitoring for the second electronic communication, transmitted to the second private repository, that includes contents that match the contents of the first electronic communication comprises:
   searching a plurality of private repositories within the domain for electronic communications that match the contents of the first electronic communication within the threshold variance;
   detecting, during the searching, the second electronic communication; and
   in response to detecting, during the searching, the second electronic communication, removing the second electronic communication from the second private repository so as to quarantine the second electronic communication.

6. The method of claim 1, wherein the first private repository is within a first domain, wherein the second private repository is within a second domain, and wherein the monitoring for the second electronic communication comprises monitoring a plurality of private repositories of the second domain for the second electronic communication.

7. The method of claim 1, further comprising:
retrieving a trust score of the second user from a database;
determining that the trust score exceeds a threshold; and
in response to determining that the trust score exceeds the threshold, delivering further electronic communications to the second user without delay, wherein the further electronic communications are delivered with a delay to another user whose trust score does not exceed the threshold.

8. A system comprising:
one or more processors for executing computer program instructions; and
a non-transitory computer-readable storage medium comprising stored computer program instructions executable by the one or more processors, the instructions when executed by the one or more processors causing the one or more processors to perform operations comprising:
determining that a first electronic communication, sent by a first user to a second user, received in a first private repository of the second user, has been identified by input from the second user as including a threat, the input expressing that the first electronic communication includes the threat;
determining a probability that the first electronic communication actually includes the threat that was identified from the input from the second user;
in response to determining that the probability that the first electronic communication actually includes the threat that was identified from the input from the second user exceeds a threshold probability, monitoring for a second electronic communication, transmitted to a second private repository of a third user, that includes contents that match the contents of the first electronic communication within a threshold variance; and
in response to, based on the monitoring, identifying the second electronic communication that includes contents that match the contents of the first electronic communication, quarantining the second electronic communication.

9. The system of claim 8, wherein quarantining the second electronic communication comprises populating a copy of the second electronic communication to an administrative private repository of an administrator.

10. The system of claim 8, wherein quarantining the second electronic communication comprises preventing the second electronic communication from being persistently stored at the second private repository.

11. The system of claim 10, further comprising populating a modified version of the second electronic communication to the second private repository.

12. The system of claim 10, wherein the first private repository is within a domain, wherein the second private repository is also within the domain, and wherein monitoring for the second electronic communication, transmitted to the second private repository, that includes contents that match the contents of the first electronic communication comprises:
searching a plurality of private repositories within the domain for electronic communications that match the contents of the first electronic communication within the threshold variance;
detecting, during the searching, the second electronic communication; and
in response to detecting, during the searching, the second electronic communication, removing the second electronic communication from the second private repository so as to quarantine the second electronic communication.

13. The system of claim 8, wherein the first private repository is within a first domain, wherein the second private repository is within a second domain, and wherein the monitoring for the second electronic communication comprises monitoring a plurality of private repositories of the second domain for the second electronic communication.

14. The system of claim 8, the operations further comprising:
retrieving a trust score of the second user from a database;
determining that the trust score exceeds a threshold; and
in response to determining that the trust score exceeds the threshold, delivering further electronic communications to the second user without delay, wherein the further electronic communications are delivered with a delay to another user whose trust score does not exceed the threshold.

15. A non-transitory computer-readable storage medium comprising stored instructions executable by one or more processors, the instructions comprising instructions to:
determine that a first electronic communication, sent by a first user to a second user, received in a first private repository of the second user, has been identified by input from the second user as including a threat;
determine a probability that the first electronic communication actually includes the threat that was identified from the input from the second user;
in response to determining that the probability that the first electronic communication actually includes the threat that was identified from the input from the second user exceeds a threshold probability, monitor for a second electronic communication, transmitted to a second private repository of a third user, that includes contents that match the contents of the first electronic communication within a threshold variance; and
in response to, based on the monitoring, identifying the second electronic communication that includes contents that match the contents of the first electronic communication, quarantine the second electronic communication.

16. The non-transitory computer-readable medium of claim 15, wherein the instructions to quarantine the second electronic communication comprise instructions to populate a copy of the second electronic communication to an administrative private repository of an administrator.

17. The non-transitory computer-readable medium of claim 15, wherein the instructions to quarantine the second electronic communication comprise instructions to prevent the second electronic communication from being persistently stored at the second private repository.

18. The non-transitory computer-readable medium of claim 17, the instructions further comprising instructions to populate a modified version of the second electronic communication to the second private repository.

19. The non-transitory computer-readable medium of claim 17, wherein the first private repository is within a domain, wherein the second private repository is also within the domain, and wherein the instructions to monitor for the second electronic communication, transmitted to the second private repository, that includes contents that match the contents of the first electronic communication comprise instructions to:
- search a plurality of private repositories within the domain for electronic communications that match the contents of the first electronic communication within the threshold variance;
- detect, during the searching, the second electronic communication; and
- in response to detecting, during the searching, the second electronic communication, remove the second electronic communication from the second private repository so as to quarantine the second electronic communication.

20. The non-transitory computer-readable medium of claim 15, wherein the first private repository is within a first domain, wherein the second private repository is within a second domain, and wherein the instructions to monitor for the second electronic communication comprise instructions to monitor a plurality of private repositories of the second domain for the second electronic communication.

* * * * *